United States Patent Office 3,241,788  
Patented Mar. 22, 1966

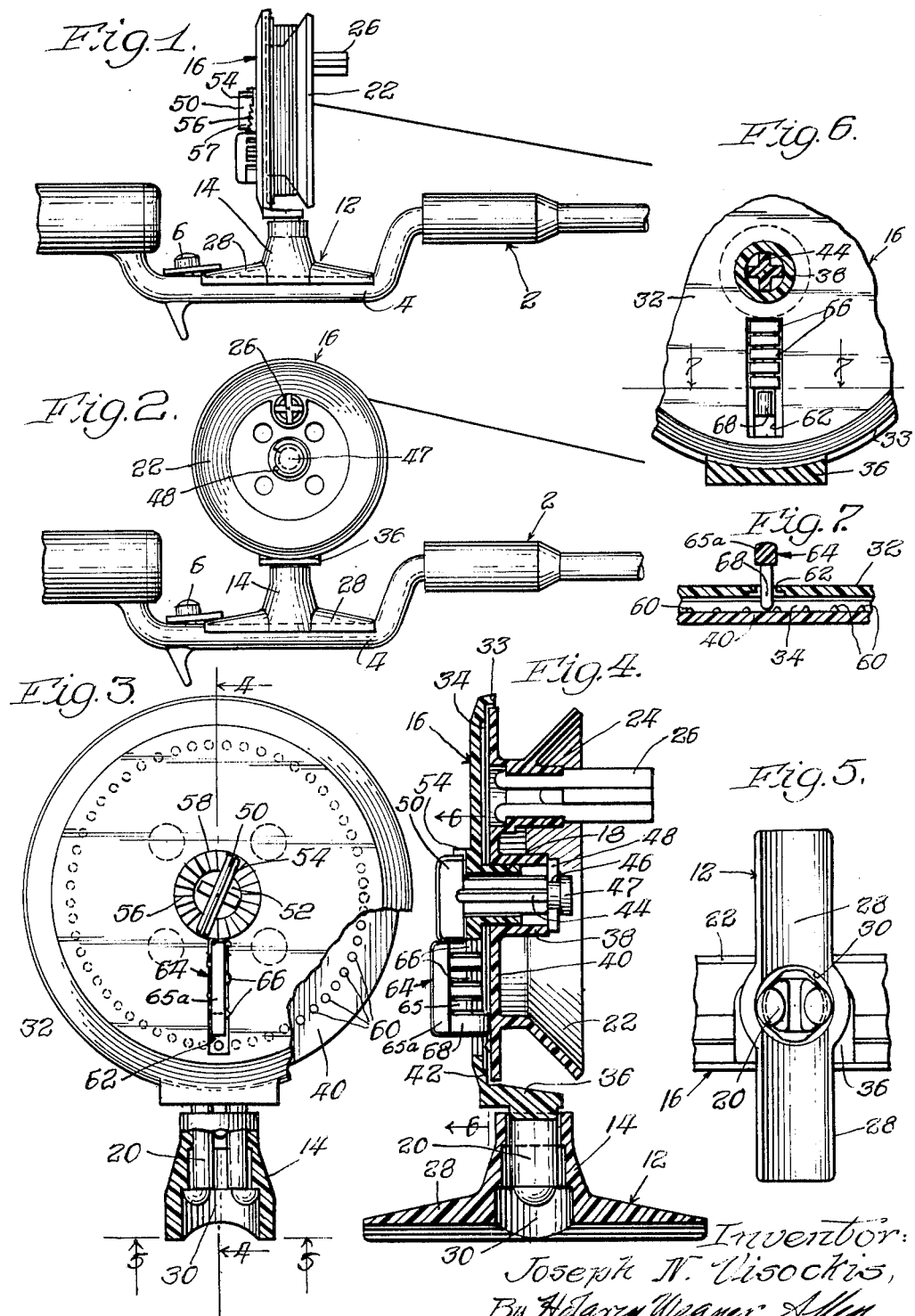

3,241,788  
PLASTIC FISHING REEL WITH A BRAKE AND CLICKER  
Joseph N. Visockis, 5204 S. Lorel Ave., Chicago 38, Ill.  
Filed Sept. 23, 1963, Ser. No. 310,832  
8 Claims. (Cl. 242—84.51)

This invention relates to fiishing reels, and more particularly to spinning reels.

The primary object of this invention is to provide a new and improved inexpensive spinning reel which may be assembled from a small number of molded plastic parts.

Another object of this invention is to provide an inexpensive reel having adjustable drag means for controlling the force necessary to rotate the spool, said means being capable of adjustment to the point of effectively locking the spool against rotation.

A further object of the invention is to construct a new and improved reel with simple parts all of which may be formed by plastic molding and which snap-fit together.

Further objects, features and advantages of the present invention will be apparent from the following description of a preferred embodiment illustrated in the accompanying drawings, in which:

FIGURE 1 is a fragmentary side elevational view of a rod showing my new and improved reel in position for casting;

FIGURE 2 is a fragmentary side elevational view of the rod showing my new and improved reel in position for retrieving line;

FIGURE 3 is an enlarged rear elevation showing my new and improved reel with the base in section and part of the frame broken away;

FIGURE 4 is a vertical sectional view taken on line 4—4 of FIGURE 3;

FIGURE 5 is a plan view of the mounting base looking from line 5—5 of FIGURE 3;

FIGURE 6 is a fragmentary sectional view taken along line 6—6 of FIGURE 4; and

FIGURE 7 is a fragmentary sectional view taken along line 7—7 of FIGURE 6.

The present invention constitutes an improvement upon the simple molded plastic spinning reel disclosed and claimed in my Patent No. 3,039,716, issued June 19, 1962; and the basic assembly of parts is similar.

As disclosed in said prior patent and shown in the present drawings, the reel comprises a reel mounting base, generally shown at 12, having an integral upright hollow boss 14; an upright frame, shown generally at 16, having a laterally extending integral spool support 18 and an integral support swivel 20 rotatably engaged with boss 14; and a spool 22 rotatably mounted on spool support 18, said spool having a hollow handle boss 24 in which a handle 26 is rotatably positioned.

Referring now more particularly to FIGURES 1 and 2, a fishing rod, generally shown at 2, has a reel support 4, and a clamp 6 by means of which the reel mounting base 12 may be detachably secured to support 4 of the rod 2.

The base 12 of the reel comprises an elongate arcuate flange 28 and an upright hollow boss 14 having a bore 30 therethrough.

The frame 16 has a disc-shaped body 32 having a circumferential rim 33 defining a spool receiving recess 34, a laterally extending integral hollow spool support 18, and a base portion 36 at right angles to the disc-shaped body 32 with an integral support swivel 20 rotatably disposed in bore 30 of base 12. The support swivel 20 and upstanding boss 14 of base 12 cooperate in such a manner as to allow frame 16 and spool 22 to be manually turned 90° between the positions shown in FIGURES 1 and 2 and retained in the selected position.

The spool 22 has a hub 38 which receives the laterally extending spool support 18 of frame 16 so that the spool 22 is freely rotatable on the support 18. The spool 22 has a substantially flat wall 40 which is received in the recess 34 of frame 16. The body 32 of frame 16 has a circumferential shoulder 42 just inside the rim 33.

The spool 22 is held on the frame 16 by retaining means including a stud 44 that extends through the hollow spool support 18 and has a circumferential groove 46 therein, and a snap-on retaining ring in the form of a split washer 48 received in groove 46 for retaining spool 22 on the frame. The other end of retaining stud 44 has a finger piece in the form of a cross pin 50 formed thereon that overlies the outer surface of the frame and provides a detent. Beneath the cross pin 50 the frame has a pair of semi-circular identical inclined planes 54 and 56 providing camming surfaces that engage cross pin 50 to cam stud 44 to the left in FIGURE 4, thus moving the flat wall 40 of spool 22 into frictional engagement with shoulder 42 of the frame. As the cross pin 50 of stud 44 is rotated so as to move up the inclined planes the spool is moved into tighter frictional engagement with frame 16.

In the embodiment shown, the inclined planes 54 and 56 have their surfaces serrated to form a plurality of radially extending locking teeth 58 for mating with the cross pin 50 to retain the pin in a selected position.

As best seen in FIGURE 3, the flat wall 40 of spool 22 has a plurality of circumferentially spaced integral nubs 60 that are near the edge of the spool and provide part of a selective clicker for the reel. The body 32 of frame 16 has an elongated radial slot 62 having undercut sides, as seen in FIGURES 6 and 7. A clicker slide member 64 makes a snap-fit in slot 62 of the frame for slidable movement lengthwise in the slot. In the embodiment shown, the clicker slide 64 is made of plastic and has a thin body portion 65 with a finger piece 65a and a plurality of oppositely extending feet 66 which snap beneath the undercut sides of slot 62. The clicker slide 64 also has a clicker foot 68 which is slightly longer than feet 66 and extends into recess 34, as seen in FIGURE 4. When the clicker slide 64 is in its upper position, shown in FIGURE 4, the spool rotates with no click. When the clicker slide 64 is moved downward to the lower end of the slot 62, the clicker foot 68 is positioned in the line of nubs 60 on the spool so that rotation of the spool causes the nubs to click over the clicker foot 68.

The intensity of the clicking action is controlled by the adjustable drag means. As the rotatable retaining means, in the form of stud 44 having detent 50, is turned up the inclined planes 54 and 56 providing camming surfaces, the wall 40 of the spool is moved into tighter frictional engagement with frame 16 thus producing a more pronounced clicking action as the nubs ride over clicker foot 68.

The foregoing detailed description is given for clearness of understanding only and no unnecessary limitations should be understood therefrom as modifications will be obvious to those skilled in the art.

I claim:

1. In a molded plastic fishing reel, in combination: a one piece molded plastic mounting base adapted to be secured to a fishing rod; a one-piece molded plastic frame mounted on said base, said frame having a disc-like body with an integral, hollow, central spool support that is open at both ends; a one-piece spool journaled on said spool support, said spool having a central hub and a circumferentially extending friction surface in facing relationship to a circumferential friction surface on said body; a one-piece molded plastic retaining stud extending axially through said spool support, said stud having at one end an integral finger piece overlying an outer surface of said body remote from the spool, said finger piece including a radially extending detent portion; a retaining member detachably engaged with the other end of said stud and having a portion radially overlapping the spool hub to retain the spool on the spool support; and an integral cam member on said outer surface of the body surrounding an open end of the spool support and underlying and engaged by the detent portion of the finger piece, said cam member having a cam surface with portions at different distances from said outer surface of the body so that rotation of the stud in the spool support moves the detent portion on the cam surface and thus moves the stud axially to vary the frictional engagement between the friction surface on the spool and the friction surface on the body.

2. The combination of claim 1 in which the cam member has a pair of semi-circular, identical inclined planes providing the circular camming surface.

3. The combination of claim 2 in which the inclined planes are provided with radial serrations which mate with the detent portion to retain the stud in a selected position.

4. The combination of claim 1 in which the cam surface is provided with radial serrations which mate with the detent portion to retain the stud in a selected position.

5. The combination of claim 1 in which the stud has a circumferential slot adjacent its said other end, and the retaining member comprises a split washer engaged in said slot.

6. The combination of claim 1 which includes selective clicker means comprising a ring of circumferentially spaced, integral nubs on the spool facing the body, a slot in the body one end of which is adjacent said nubs and the other end of which is remote from the nubs, and a one piece clicker member slidably mounted in said slot and having a portion which engages said nubs only when the clicker member is positioned at said one end of the slot, adjustment of the stud acting to vary the depth of engagement between the clicker member and the nubs.

7. The combination of claim 6 in which the clicker member has a thin body portion in the slot, a finger piece overlying the outer surface of the frame body, and a plurality of oppositely extending retaining feet underlying the inner surface of the frame body at the sides of the slot, said feet being adapted to snap through the slot to assemble the clicker member with the frame.

8. The combination of claim 6 in which the friction surface on the spool extends along the spool periphery, and the frame body has an annular shoulder providing the body friction surface, said shoulder being concentric with the ring of nubs on the spool.

References Cited by the Examiner

UNITED STATES PATENTS

| | | | |
|---|---|---|---|
| 462,659 | 11/1891 | Barnes | 192—93 |
| 858,789 | 7/1907 | Brachmann | 192—93 X |
| 1,115,944 | 11/1914 | Krotz | 192—93 X |
| 1,673,382 | 6/1928 | Hofe | 242—84.5 |
| 2,209,598 | 7/1940 | Coxe | 242—84.44 |
| 2,550,271 | 4/1951 | Kagel | 242—84.2 |
| 3,039,716 | 6/1962 | Visockis | 242—84.2 |

FOREIGN PATENTS

| | | |
|---|---|---|
| 795,401 | 1/1936 | France. |
| 1,201,748 | 7/1959 | France. |

MERVIN STEIN, *Primary Examiner.*